United States Patent [19]

Sato et al.

[11] Patent Number: 5,777,727
[45] Date of Patent: Jul. 7, 1998

[54] OTDR MEASUREMENT DEVICE

[75] Inventors: Yasushi Sato; Haruyoshi Uchiyama, both of Tokyo, Japan

[73] Assignee: Ando Electric Co., Ltd., Tokyo, Japan

[21] Appl. No.: 864,446

[22] Filed: May 28, 1997

[30] Foreign Application Priority Data

May 30, 1996 [JP] Japan .................................. 8-137200

[51] Int. Cl.$^6$ .......................... G01N 21/84; G01N 21/88
[52] U.S. Cl. ............................................................ 356/73.1
[58] Field of Search .................................................. 356/73.1

[56] References Cited

U.S. PATENT DOCUMENTS 4,708,471  11/1987  Beckmann et al. ..................... 356/73.1

*Primary Examiner*—Vincent P. McGraw
*Attorney, Agent, or Firm*—Finnegan, Henderson, Farabow, Garrett & Dunner, L.L.P.

[57] ABSTRACT

An OTDR measurement device employs optical heterodyne wave detection to perform measurement on optical fibers. Optical pulses are incident on a measuring optical fiber, which in turn outputs backward scattering light. The device performs heterodyne wave detection on the backward scattering light as well as probe light whose frequency is set in proximity to a frequency of the backward scattering light, thus producing a detection voltage. The device provides a differential amplifier which performs amplification on a difference between the detection voltage and a reference voltage to produce a difference signal. An A/D converter converts the difference signal to a digital signal. Square addition is performed on the digital signal to produce a mean square signal representing property of the measuring optical fiber. Herein, calculations are performed on the mean square signal to produce a reference signal, which is then converted to the reference voltage. Herein, the reference signal is produced based on a reference value which is determined in advance such that the difference signal corresponds to an intermediate value of a voltage conversion range of the A/D converter under a state where only the probe light is incident on the device. Moreover, the reference signal is automatically changed to correct a shift of the reference voltage due to disturbance factors such as variations of temperature.

5 Claims, 4 Drawing Sheets

OTDR MEASUREMENT DEVICE

BACKGROUND OF THE INVENTION

This invention relates to OTDR measurement devices which are used in the fields of the optical communications to perform measurement on optical fibers. Herein, 'OTDR' is an abbreviation for 'Optical Time Domain Reflectometer'.

An OTDR method is conventionally developed to detect positions of break points of optical fibers and/or losses of connections of optical fibers. This method applies light pulses, having a strong intensity, to one end of a measuring optical fiber. So, backward scattering light occurs due to Rayleigh scattering, whilst reflecting light occurs due to connections and/or break points of the measuring optical fiber. The backward scattering light and/or reflecting light progress backwardly as returned light to arrive the end of the measuring optical fiber. By measuring an intensity and an arrival time of the returned light, it is possible to detect positions of the break points and losses of the connections with respect to the measuring optical fiber.

FIG. 2 is a block diagram showing an example of an OTDR measuring device employing the known technology of heterodyne wave detection. The OTDR measurement device of FIG. 2 uses a measuring optical fiber (not shown) as well as optical fibers 1 and 2. Herein, light pulses are incident on the measuring optical fiber, which in turn provides backward scattering light. Normally, a period of the light pulses which are incident on the measuring optical fiber, is set at several milli seconds. Now, probe light, radiated from a CW light source (where 'CW' is an abbreviation for 'Continuous Wave'), is incident on a first end of the optical fiber 1, whilst the backward scattering light is incident on a first end of the optical fiber 2. A frequency of the probe light is set in proximity to a frequency of the aforementioned light pulses incident on the measuring optical fiber.

An optical coupler 3, such as a connector of 3 dB, has 2 incoming terminals and 2 outgoing terminals. Herein, 2 light beams which are respectively incident on the 2 incoming terminals, are subjected to wave mixture; then, mixed beams are subjected to branching so that 2 branch beams, each having a same intensity, are produced. So, the optical coupler 3 provides the 2 branch beams at the 2 outgoing terminals respectively. Second ends of the optical fibers 1, 2 are optically connected to the incoming terminals of the optical coupler 3, whilst the outgoing terminals of the optical coupler 3 are respectively connected to first ends of optical fibers 4, 5. Light-receiving elements 6a, 6b, such as photodiodes, are optically connected to the optical fibers 4, 5. So, the light-receiving elements 6a, 6b receive beams outputted from second ends of the optical fibers 4, 5 respectively. Herein, each light-receiving element detects an intensity of an incoming beam thereof to produce electric current (hereinafter, referred to as detection current). Incidentally, the light-receiving elements 6a, 6b are connected in series.

The aforementioned optical coupler 3 and the light-receiving elements 6a, 6b are assembled together to form a balance light receiver. Normally, the aforementioned probe light is set to have a high intensity. However, as the intensity becomes higher, an amount of AM noise becomes larger, which is not negligible. So, an increase of an amount of AM noise badly affects a measurement precision. In the balance light receiver, the optical coupler 3 performs the wave mixture and branching on the probe light and backward scattering light; then, the light-receiving elements 6a, 6b receive the branch beams to produce detection current.

Herein, the detection current of the light-receiving element 6a and the detection current of the light-receiving element 6b are mixed together by a same gain and a same delay time. Thus, it is possible to cancel an effect of the AM noise. In other words, it is possible to efficiently detect a factor of contribution of the backward scattering light only. Incidentally, an optical heterodyne wave detection circuit is constructed by the optical fibers 1, 2, the optical coupler 3, the optical fibers 4, 5, and the light-receiving elements 6a, 6b.

Next, a current-voltage converter 7 converts the detection current of the light-receiving elements 6a, 6b to electric voltage (hereinafter, referred to as detection voltage). FIG. 4 shows an example of a waveshape representing the detection voltage outputted from the current-voltage converter 7. The waveshape representing the detection voltage varies in a symmetrical manner with respect to a certain value of voltage 'N' based on the probe light, wherein envelopes (see dotted lines) sandwiching the waveshape are drawn symmetrically. A differential amplifier 8 amplifies or damps a difference between voltages applied to 2 inputs thereof, thus producing a difference signal. An example of the difference signal is shown in FIG. 5. For convenience' sake, FIG. 5 shows only envelopes for a waveshape (not shown) representing the difference signal. FIG. 5 shows that a minimum value of the difference signal in voltage is 0 V, whilst a maximum value is 2 V. In addition, a center value is 1 V.

A first input of the differential amplifier 8 receives the detection voltage outputted from the current-voltage converter 7, whilst a second input receives a reference voltage which is set by a variable resistor 8a. An analog-to-digital converter (abbreviated as 'A/D converter') 9 performs standardization and quantization on the difference signal outputted from the differential amplifier 8. Thus, the A/D converter 9 produces digital signals of 8 bits. Herein, the A/D converter 9 has a period of standardization which is approximately set at 10 nano seconds. So, the A/D converter 9 performs the standardization on the difference signals input thereto by the above period of standardization. Such a period of standardization corresponds to a time which is required for a light pulse to propagate through the measuring optical fiber by approximately 1 m. As described before, the difference signals as shown in FIG. 5 are input to the A/D converter 9. If a voltage of the difference signal is 0 V, the A/D converter 9 produces a 8-bit digital signal whose binary code is '00000000'. If a voltage of the difference signal is 2 V, the A/D converter 9 produces a 8-bit digital signal whose binary code is '11111111'.

A square circuit 10, which is digitally configured, performs square calculations on the digital signals outputted from the A/D converter 9. Thus, the square circuit 10 produces square signals. By the way, if the difference signals, shown in FIG. 5, are simply averaged, an average value thereof remains constant, in other words, a result of averaging is 1 V. So, no envelopes are obtained by the averaging. In contrast, the OTDR measurement device of FIG. 2 employs square calculations. That is, the square circuit 10 performs square calculations on the digital signals which are digital equivalence of the difference signals. Thus, weighting is performed on the 'digital' difference signals. Thanks to the weighting, it is possible to obtain envelopes even if averaging is performed.

An addition circuit 11 effects an accumulated addition process in time on the square signals outputted from the square circuit 10. Thus, the adder 11 produces mean square signals. FIG. 3 is a block diagram showing a basic configuration of the addition circuit 11. In FIG. 3, a latch 51 latches a square signal of 16 bits inputted thereto. An adder 52 performs addition on the square signal latched by the latch 51 and another signal which is latched by a latch 54. A random-access memory (RAM) 53 stores results of the addition performed by the adder 52. The RAM 53 has a number of storage areas each of which has a specific address and each of which corresponds to data of 16 bits. The addition circuit 11 of FIG. 3 further contains an addition control LSI circuit 55 (where 'LSI' is an abbreviation for 'Large Scale Integration'), which is provided to control the latch 51, the adder 52, the RAM 53, and the latch 54.

Next, an explanation will be given with respect to operations of the addition circuit of FIG. 3. At first, a square signal is input to and is latched by the latch 51. The addition control LSI circuit 55 designates an address to read out a signal from the RAM 53. So, the signal is read out from the storage area corresponding to the address and is then latched by the latch 54. The adder 52 performs addition on the square signal of the latch 51 and the latched signal of the latch 54. Then, a result of the addition is stored in the storage area of the RAM 53 which corresponds to the above address.

By the way, the aforementioned A/D converter 9 shown in FIG. 2 has an extremely short period of the standardization. So, the aforementioned operations and configuration of the addition circuit 11 of FIG. 3 cannot catch up with such an extremely short period of the standardization. In other words, the addition circuit 11 of FIG. 3 may lack a capability to perform the addition process thereof at appropriate timings. For this reason, the addition circuit is redesigned to provide multiple adders to achieve the function of the adder 52. So, the adders are individually and sequentially activated to perform the addition process; and consequently, a time required for the addition process is reduced.

Suppose that the probe light having a constant frequency as well as a constant intensity is incident on the first end of the optical fiber 1 and is input to the optical coupler 3. When light pulses are incident on the measuring optical fiber, backward scattering light is correspondingly generated from the measuring optical fiber and is incident on the first end of the optical fiber 2. In optical coupler 3, the probe light and backward scattering light are subjected to wave mixture and branching to produce branch beams. The branch beams propagate through the optical fibers 4 and 5 respectively. So, the light-receiving elements 6a and 6b receive the branch beams. Herein, the frequency of the probe light incident on the optical fiber 1 is set in proximity to a frequency of the backward scattering light. So, if they are subjected to wave mixture in the optical coupler 3, beat signals occur in response to a difference between the frequencies. The beat signals are detected by the light-receiving elements 6a and 6b, which in turn produce detection current.

The detection current of the light-receiving elements 6a and 6b is forwarded to the current-voltage converter 7 wherein it is converted to detection voltage as shown in FIG. 4. The detection voltage is applied to the differential amplifier 8 as its first input, whilst reference voltage is applied as the second input. A difference between the detection voltage and reference voltage is amplified or attenuated to produce a difference signal as shown in FIG. 5. The A/D converter 9 converts the difference signal to a digital signal of 8 bits. The square circuit 10 and the addition circuit 11 perform square calculations and addition on the digital signals to produce a mean square signal.

The OTDR measurement device of FIG. 2 is designed upon a precondition that the variable resistor 8a sets a certain value to the aforementioned reference voltage input to the differential amplifier 8 in advance before the device starts measurement. If a reduction occurs in the reference voltage so that a value of the difference signal input to the A/D converter 9 increases to be higher than 2 V, a problem occurs in conversion of the A/D converter 9 because the A/D converter 9 is originally designed to perform an analog-to-digital conversion with respect a limited range of voltages which range between 0 V and 2 V. In other words, if the difference signal exceeds 2 V, the A/D converter 9 constantly outputs a digital signal representing a binary code of '11111111'. In short, if a variation occurs in the reference voltage, saturation occurs in conversion of the A/D converter 9.

SUMMARY OF THE INVENTION

It is an object of the invention to provide an OTDR measurement device which is capable of automatically correcting a reference voltage which is used to perform measurement on optical fibers.

An OTDR measurement device employs optical heterodyne wave detection to perform measurement on optical fibers. Optical pulses are incident on a measuring optical fiber, which in turn outputs backward scattering light. The device performs heterodyne wave detection on the backward scattering light as well as probe light whose frequency is set in proximity to a frequency of the backward scattering light. When the probe light and backward scattering light are subjected to wave mixture, beat signals correspondingly occur in response to a difference between their frequencies. So, detection current is produced based the beat signals and is then converted to detection voltage. The device provides a differential amplifier which performs amplification on a difference between the detection voltage and a reference voltage to produce a difference signal. An A/D converter converts the difference signal to a digital signal. Square addition is performed on the digital signal to produce a mean square signal representing property of the measuring optical fiber. Herein, calculations are performed on the mean square signal to produce a reference signal, which is then converted to the reference voltage.

The reference signal is produced based on a reference value which is determined in advance such that the difference signal corresponds to an intermediate value of a voltage conversion range of the A/D converter under a state where only the probe light is incident on the device. In addition, the reference signal is automatically changed to correct a shift of the reference voltage due to disturbance factors such as variations of temperature.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
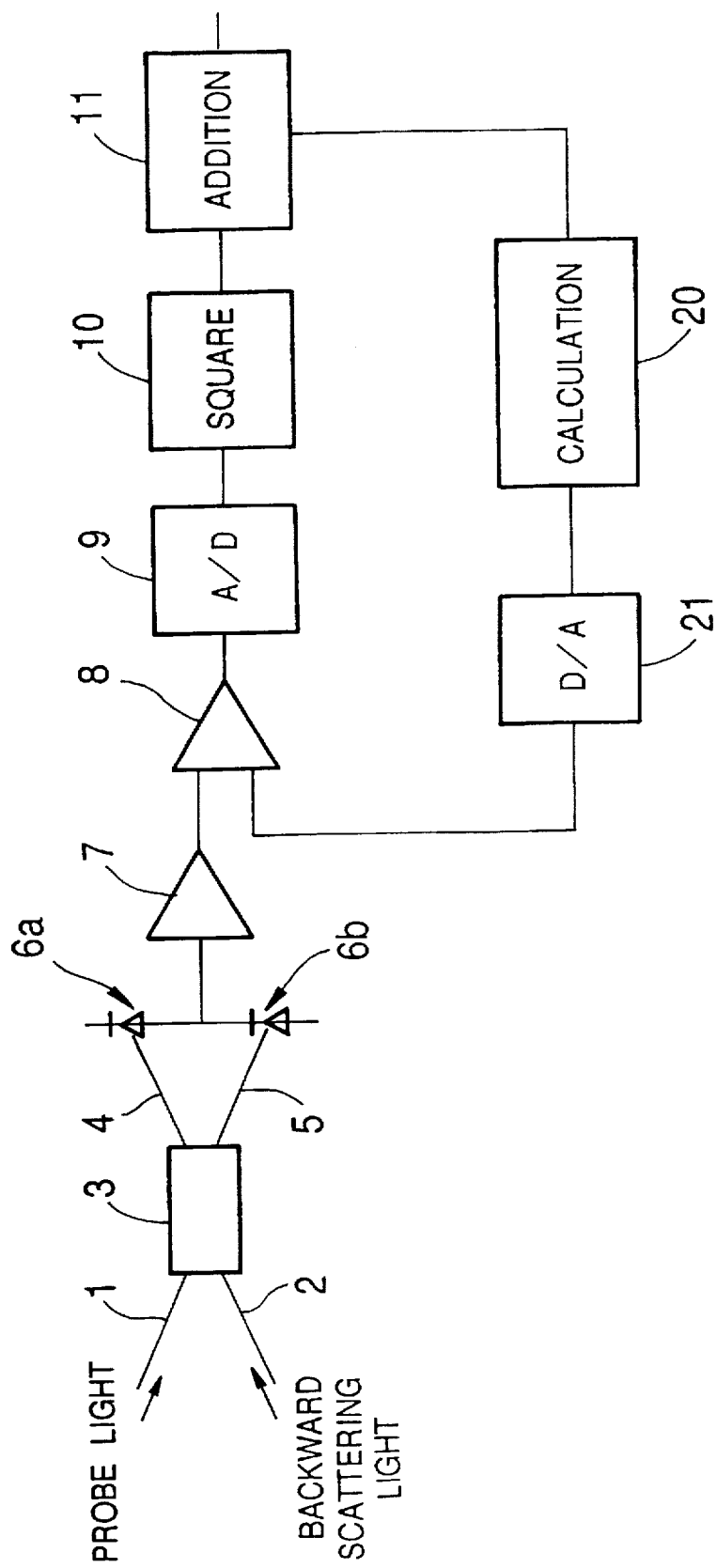
FIG. 1 is a block diagram showing an OTDR measurement device which is designed in accordance with an embodiment of this invention.
Figure 2:
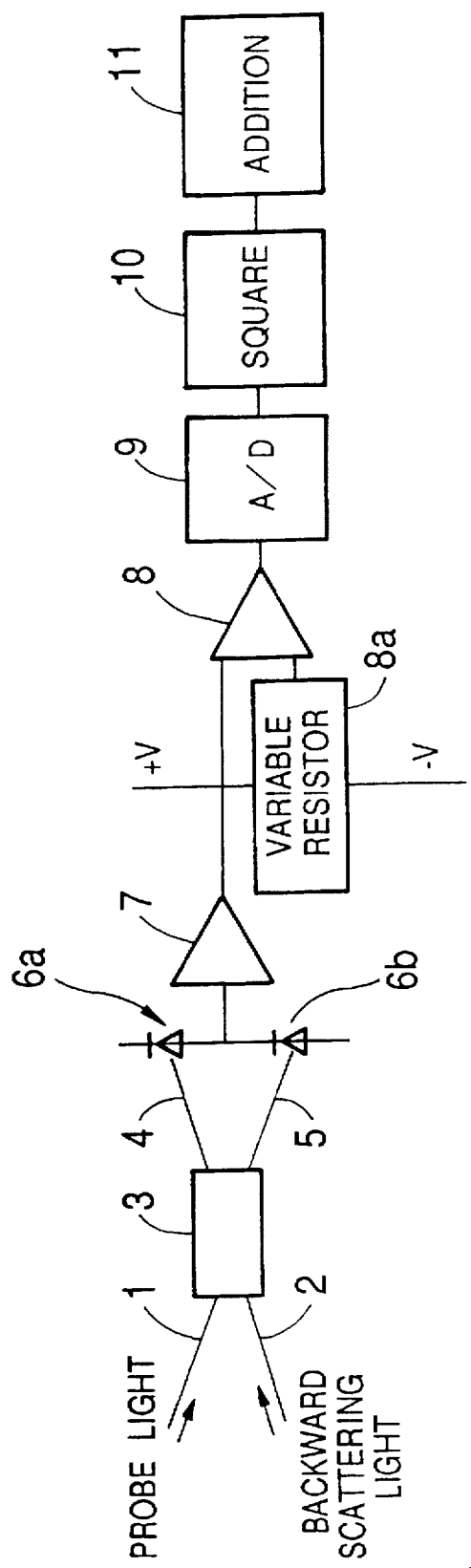
FIG. 2 is a block diagram showing an example of an OTDR measurement device employing the known technology of heterodyne wave detection.
Figure 3:
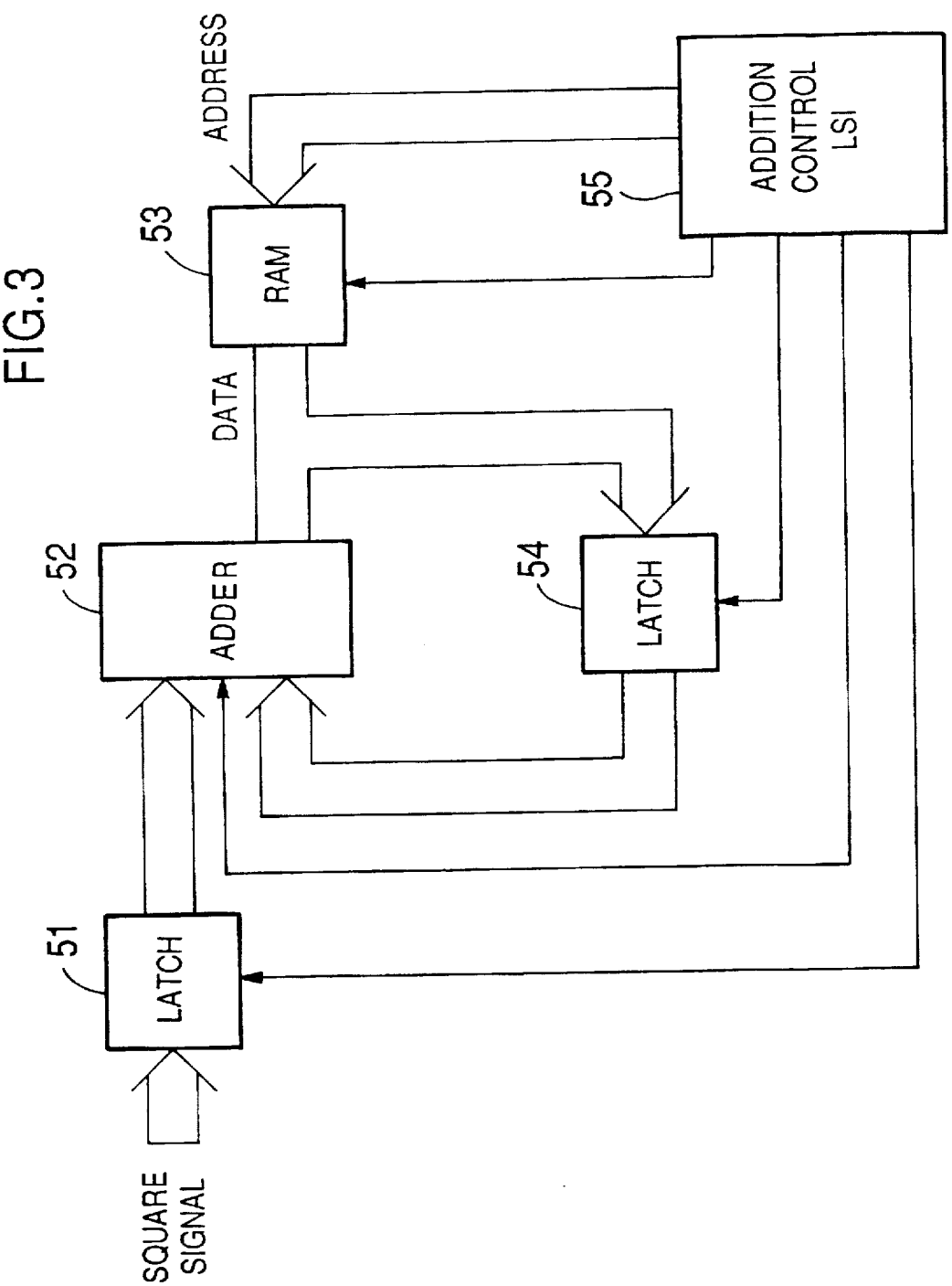
FIG. 3 is a block diagram showing a configuration of an addition circuit shown in FIG. 2.

Now, a description will be given with respect to an OTDR measurement device which is designed in accordance with an embodiment of this invention in conjunction with FIG. 1. In FIG. 1, parts equivalent to those of FIG. 2 will be designated by the same numerals; hence, a description thereof will be omitted. Different from the aforementioned OTDR measurement device of FIG. 2 employing the conventional heterodyne wave detection, the OTDR measurement device of FIG. 1 replaces the variable resistor 8a with a series circuit consisting of a calculation circuit 20 and a digital-to-analog converter (hereinafter, referred to as 'D/A converter') 21. So, the mean square signal outputted from the addition circuit 11 is supplied to the series circuit wherein it is converted to a reference voltage which is applied to the differential amplifier 8 as its second input.

The calculation circuit 20 is designed to produce a reference signal based on the mean square signal, outputted from the addition circuit 11, under a situation where the backward scattering light from the measuring optical fiber is not incident on the optical fiber 2 but the probe light is only incident on the optical fiber 1. The reference signal has an intermediate value in a voltage range of the conversion made by the A/D converter 9; in other words, the reference signal has an intermediate value in a voltage range that the A/D converter 9 is capable of performing the conversion on the difference signal without causing the saturation. For example, if the mean square signal has a value of '1.21', the difference signal corresponding thereto is 1.1 V. If the voltage range of the conversion of the A/D converter 9 lies between 0 V and 2 V, the calculation circuit 20 adds a value of 0.1 V to the reference signal currently produced. The D/A converter 21 converts the reference signal, outputted from the calculation circuit 20, to an 'analog' reference voltage having an offset value.

Figure 5:
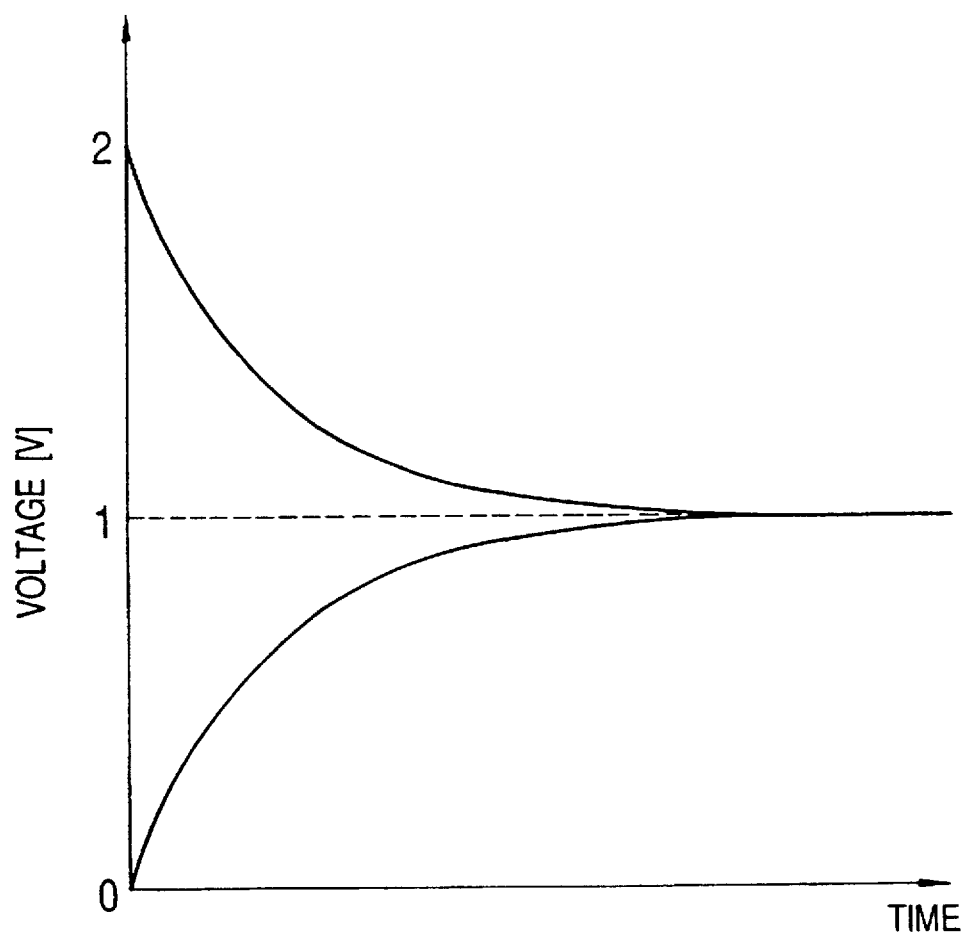
FIG. 5 is a graph showing envelopes of a waveshape representing a difference signal used in FIG. 2.

As described heretofore, the A/D converter 9 performs conversion on the difference signal shown in FIG. 5 with regard to the voltage range of conversion which lies between 0 V and 2 V. In addition, the A/D converter 9 converts an input voltage of 0 V to a 8-bit digital signal representing a binary code of '00000000', whilst it converts an input voltage of 2 V to a 8-bit digital signal representing a binary code of '11111111'. Further, a predetermined reference value is set to the calculation circuit 20 in advance. So, under the situation where only the probe light is only input to the OTDR measurement device of FIG. 1, the difference signal input to the A/D converter 9 is controlled to have an intermediate value in the voltage range of the conversion of the A/D converter 9.

Now suppose an initial state that the probe light having a constant frequency and a constant intensity is incident on the optical fiber 1 and is then input to the optical coupler 3. Next, light pulses are incident on the measuring optical fiber so that backward scattering light is correspondingly generated and is incident on the optical fiber 2. So, the probe light and backward scattering light are subjected to wave mixture and branching in the optical coupler 3, which in turn produces branch beams. The branch beams propagate through the optical fibers 4 and 5 respectively, so that they are received by the light-receiving elements 6a and 6b. Herein, the frequency of the probe light incident on the optical fiber 1 is set in proximity to a frequency of the backward scattering light which is incident on the optical fiber 2 from the measuring optical fiber. So, when the optical coupler 3 performs the wave mixture on the probe light and backward scattering light, beat signals occur in response to a difference between their frequencies. The beat signals are detected by the light-receiving elements 6a and 6b, which in turn produce detection current.

Figure 4:
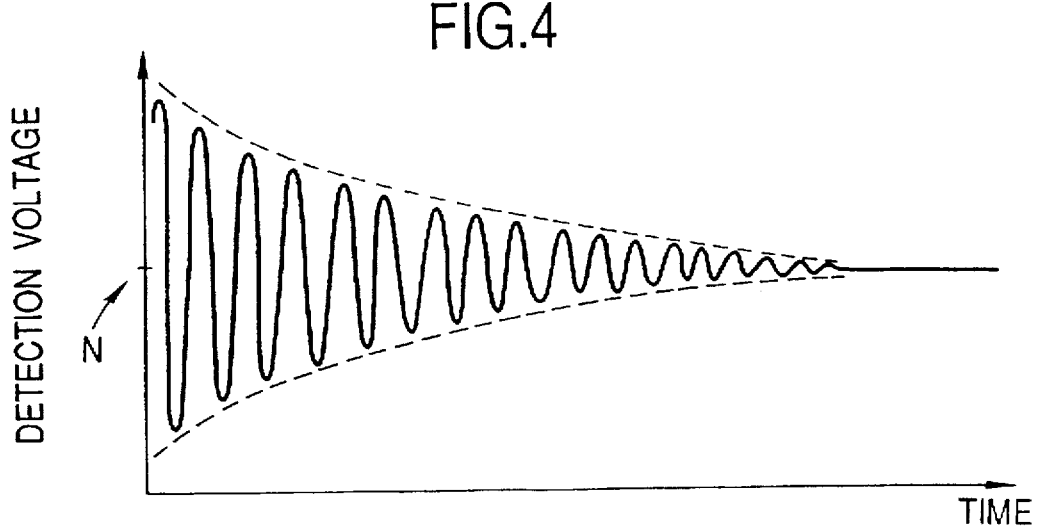
FIG. 4 is a graph showing a waveshape representing a detection voltage used in FIG. 2.

The detection current outputted from the light-receiving elements 6a and 6b is converted to detection voltage shown in FIG. 4 by the current-voltage converter 7. The differential amplifier 8 receives the detection voltage as the first input thereof while receiving a reference voltage as the second input thereof. Herein, the reference voltage is produced by the D/A converter 21. So, a difference between the detection voltage and reference voltage is amplified or attenuated. Thus, the differential amplifier 8 produces a difference signal, which is forwarded to the A/D converter 9. So, the A/D converter 9 converts the difference signals to digital signals. The digital signals are subjected to square addition by the square circuit 10 and the addition circuit 11. Thus, it is possible to produce a mean square signal of 16 bits.

The mean square signal is input to the calculation circuit 20. The calculation circuit 20 calculates a mean addition value with respect to values which are input thereto in a time length corresponding to a certain distance which is longer than the length of the measuring optical fiber. The calculation circuit 20 compares the mean addition value with the predetermined reference value thereof. If the mean addition value is identical to the predetermined reference value, the calculation circuit 20 outputs a reference signal having the predetermined reference value. The reference signal is input to the D/A converter 21 and is converted to an analog reference voltage, which is then forwarded to the differential amplifier 8 as its second input.

Now, suppose a situation where the reference voltage outputted from the D/A converter 21 is somewhat shifted so that the mean square signal represents a 16-bit binary code of '0100010000010000'. Such a binary code is a squared value. So, the square root of it is represented by a 8-bit binary code of '10000100'. A value corresponding to the 8-bit binary code is equivalent to an output value of the A/D converter 9 inputting a difference signal of 1.035 V. As described before, the calculation circuit 20 produces a mean addition value with respect to values which are input thereto in a time length corresponding a certain distance which is longer than the length of the measuring optical fiber. Based on the mean addition value, the calculation circuit 20 changes the reference signal such that an output of the A/D converter 9 is reduced by 0.035 V. By the way, the D/A converter 21 is constructed by a 6-bit converter wherein 1 step (i.e., one bit position) corresponds to 0.05 V. In that case, the calculation circuit 20 performs a process to lower an input to the D/A converter 21 by 7 steps. Thanks to such a process, it is possible to correct a shift of the reference voltage supplied to the differential amplifier 8.

According to the embodiment of this invention, the OTDR measurement device is capable of suppressing variations of characteristics thereof due to disturbance factors such as variations of temperature. In some case, for example, the reference voltage input to the A/D converter 9 is affected by variations of temperature inside of the device, so that variations of ±0.05 V occur on the reference voltage. In such a case, if a 6-bit D/A converter whose output in 1 step corresponds to 0.005 V is equipped with the device, it is possible to suppress an amount of error. That is, the device merely provides a maximum amount of error, regarding the center value of the reference voltage, at 0.005 V.

If the detection voltage varies in a range between 0.0025 V and 1.9975 V so that the reference voltage varies by +0.05

V, a difference between voltages input to the differential amplifier 8 varies in a range between 0.0525 V and 2.0475 V. As described before, the A/D converter 9 provides a constant output, corresponding to a limit input voltage of 2 V, with respect to 'large' input voltages which exceed 2 V. For this reason, the device is capable of obtaining 'accurate' values of the measurement thereof with respect to only a limited voltage range between 0.05 V and 1.95 V. Now, a voltage range which the device is capable of performing an analog-to-digital conversion will be referred to as a convertible voltage range.

Next, a comparison is made with respect to dynamic ranges calculated on 2 convertible voltage ranges, i.e., a first convertible voltage range between 0.0025 V and 1.9975 V and a second convertible voltage range between 0.05 V and 1.95 V. In the aforementioned example of the OTDR measurement device, under an ideal state where no shift occurs in center value of the input voltage of the A/D converter 9 and noise component is zero, it is possible to calculate the dynamic range of 44.9 dB in accordance with a mathematical expression as follows:

$$(FF(H)^\wedge 2) \times 2^{15} + (OC(H)^\wedge 2) \times 2^{15} - (86(H)^\wedge 2) \times 2^{16}$$

In the above, numerals preceding (H) represent a hexadecimal code. In addition, a symbol "^" represents multiplication which is performed using a number following it on the hexadecimal code.

In the OTDR measurement device of the present embodiment, it is possible to calculate the dynamic range of 45.1 dB in accordance with a mathematical expression as follows:

$$(FF(H)^\wedge 2) \times 2^{15} + (00(H)^\wedge 2) \times 2^{15} - (80(H)^\wedge 2) \times 2^{16}$$

So, there is a difference of 0.2 dB between the dynamic ranges which are calculated on the OTDR measurement devices described above. Such a dynamic-range difference affects a relatively high voltage range of the detection voltage input to the A/D converter 9. In other words, the dynamic-range difference affects the measurement on the near-end side of the measuring optical fiber. If a loss of the measuring optical fiber is 0.25 dB per 1 Km, the OTDR measurement device is capable of providing a high precision in measurement of the measuring optical fiber with respect to its near-end side having a length (i.e., 800 m) which corresponds to a loss of 0.2 dB.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An OTDR measurement device comprising:

optical wave detection means for performing optical heterodyne wave detection on incident light thereof, which is given from a measuring optical fiber, to produce a wave detection signal;

an A/D converter for converting an input signal thereof to a digital signal;

first calculation means for performing square addition on the digital signal to produce a mean square signal;

second calculation means for calculating an offset value for the A/D converter on the basis of the mean square signal which is outputted from the first calculation means under a state where the optical wave detection means does not output the wave detection signal; and a differential amplifier for performing differential amplification on a difference between the wave detection signal and an output of the second calculation means, so that an output thereof is provided as the input signal of the A/D converter.

2. An OTDR measurement device comprising:

optical wave detection means for performing optical heterodyne wave detection on incident light thereof, which is given from a measuring optical fiber, to produce a wave detection signal;

an A/D converter for converting an input signal thereof to a digital signal;

first calculation means for performing square addition on the digital signal to produce a mean square signal;

second calculation means for calculating an offset value for the A/D converter on the basis of the mean square signal which is outputted from the first calculation means under a state where the optical wave detection means does not receive the incident light from the measuring optical fiber, wherein the second calculation means varying the offset value based on the mean square signal; and a differential amplifier for performing differential amplification on a difference between the wave detection signal and an output of the second calculation means, so that an output thereof is provided as the input signal of the A/D converter.

3. An OTDR measurement device comprising:

heterodyne wave detection means for performing heterodyne wave detection on probe light and backward scattering light which responds to light pulses incident on a measuring optical fiber, thus producing a detection voltage, wherein a frequency of the probe light is set in proximity to a frequency of the backward scattering light;

an A/D converter for converting an input thereof to a digital signal;

first calculation means for performing square addition on the digital signal to produce a mean square signal;

second calculation means for performing calculations on the mean square signal to produce a reference signal based on a reference value;

a D/A converter for converting the reference signal to a reference voltage; and a differential amplifier for performing amplification on a difference between the detection voltage and the reference voltage to produce a difference signal which is input to the A/D converter, wherein the reference value of the second calculation means is determined in advance such that the difference signal corresponds to an intermediate value of a voltage conversion range of the A/D converter under a state where only the probe light is incident on the heterodyne wave detection means.

4. An OTDR measurement device as defined in claim 3 wherein the second calculation means automatically changes the reference signal to correct a shift of the reference voltage.

5. An OTDR measurement device as defined in claim 3 wherein the second calculation means produces the reference signal which corresponds to the reference value if the mean square signal is identical to the reference value.

* * * * *